(12) United States Patent
Reynolds, III et al.

(10) Patent No.: US 6,673,289 B2
(45) Date of Patent: Jan. 6, 2004

(54) MANUFACTURE OF MATERIALS FROM GRAPHITE PARTICLES

(75) Inventors: Robert Anderson Reynolds, III, Bay Village, OH (US); Julian Norley, Chagrin Falls, OH (US); Ronald Alfred Greinke, Medina, OH (US)

(73) Assignee: Advanced Energy Technology inc., Wilmington, DE (US)

( * ) Notice: Subject to any disclaimer, the term of this patent is extended or adjusted under 35 U.S.C. 154(b) by 0 days.

(21) Appl. No.: 09/870,313

(22) Filed: May 30, 2001

(65) Prior Publication Data

US 2002/0180093 A1 Dec. 5, 2002

(51) Int. Cl.⁷ .............................. B29B 9/04; B29C 43/22
(52) U.S. Cl. ...................... 264/115; 264/119; 264/911
(58) Field of Search ............................. 264/37.3, 115, 264/116, 119, 345, 913, 911

(56) References Cited

U.S. PATENT DOCUMENTS

| | | | |
|---|---|---|---|
| 3,404,061 A | | 10/1968 | Shane et al. ................. 161/125 |
| 4,244,934 A | * | 1/1981 | Kondo et al. ................ 264/109 |
| 4,895,713 A | | 1/1990 | Greinke et al. .............. 423/448 |
| 5,176,863 A | * | 1/1993 | Howard ........................ 264/113 |
| 5,882,570 A | | 3/1999 | Hayward ................. 264/328.18 |
| 5,885,728 A | | 3/1999 | Mercuri et al. ................. 429/30 |
| 5,902,762 A | | 5/1999 | Mercuri et al. ................. 501/99 |
| 6,037,074 A | | 3/2000 | Mercuri et al. ................. 429/34 |
| 6,217,800 B1 | | 4/2001 | Hayward .................... 264/29.1 |

OTHER PUBLICATIONS

International Publication No. WO 00/64808, International Publication Date Nov. 2, 2000, "Flexible Graphite Article And Method Of Manufacture", Ucar Graph–Tech Inc.

International Publication No. WO 00/54953, International Publication Date Sep. 21, 2000, "Graphite Foam Material and Method of Making Same", SGL Technic, Inc. (Inventor Hayward).

* cited by examiner

Primary Examiner—Mary Lynn Theisen
(74) Attorney, Agent, or Firm—Waddey & Patterson, P.C.; James R. Cartiglia

(57) ABSTRACT

A method of manufacturing flexible sheets of expanded graphite material from recycled materials, comprising providing source materials in the form of flexible sheets of expanded graphite; comminuting the source materials into particles; re-expanding the particles; and preparing a mat from the re-expanded particles. Also described herein is a process of manufacturing a graphite material comprising grinding a cured resin impregnated graphite material into particles; removing at least part of the resin from the particles; and expanding the resin removed particles.

26 Claims, 5 Drawing Sheets

MANUFACTURE OF MATERIALS FROM GRAPHITE PARTICLES

TECHNICAL FIELD

A method is provided for manufacturing flexible sheets or mats of expanded graphite material from recycled materials. The manufacturing method of the present invention may be used to manufacture flexible sheets or mats of expanded graphite material that are suitable for use in the manufacture of components in a proton exchange membrane fuel cell, such as a flow field plate or an electrode.

BACKGROUND OF THE ART

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell includes a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

The flow field plates may be flexible graphite sheets as described herein that are deformed into a shape (e.g., by embossing, stamping, molding, or a calender roll) that has a continuous reactant flow channel with an inlet and an outlet. The inlet is connected to a source of fuel in the case of an anode flow field plate, or a source of oxidant in the case of a cathode flow field plate. When assembled in a fuel cell stack, each flow field plate functions as a current collector.

Electrodes may be formed by providing a graphite sheet as described herein and providing the sheet with channels, which are preferably smooth-sided, and which pass between the parallel, opposed surfaces of the flexible graphite sheet and are separated by walls of compressed expandable graphite. It is the walls of the flexible graphite sheet that actually abut the ion exchange membrane, when the inventive flexible graphite sheet functions as an electrode in an electrochemical fuel cell.

The channels are formed in the flexible graphite sheet at a plurality of locations by mechanical impact. Thus, a pattern of channels is formed in the flexible graphite sheet. That pattern can be devised in order to control, optimize or maximize fluid flow through the channels, as desired. For instance, the pattern formed in the flexible graphite sheet can comprise selective placement of the channels, as described, or it can comprise variations in channel density or channel shape in order to, for instance, equalize fluid pressure along the surface of the electrode when in use, as well as for other purposes which would be apparent to the skilled artisan.

The impact force is preferably delivered using a patterned roller, suitably controlled to provide well-formed perforations in the graphite sheet. In the course of impacting the flexible graphite sheet to form channels, graphite is displaced within the sheet to disrupt and deform the parallel orientation of the expanded graphite particles. In effect the displaced graphite is being "die-molded" by the sides of adjacent protrusions and the smooth surface of the roller. This can reduce the anisotropy in the flexible graphite sheet and thus increase the electrical and thermal conductivity of the sheet in the direction transverse to the opposed surfaces. A similar effect is achieved with frusto-conical and parallel-sided peg-shaped flat-ended protrusions.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles and graphite layers substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

Methods of manufacturing articles from graphite particles have been proposed. For example, U.S. Pat. No. 5,882,570 to Hayward discloses a method of grinding flexible unimpregnated graphite foil to a small particle size, thermally shocking the particles to expand them, mixing the expanded graphite with a thermoset phenolic resin, injection molding the mixture to form low density blocks or other shapes, then heat treating the blocks to thermoset the material. The resulting blocks may be used as insulating material in a furnace or the like. WO 00/54953 and U.S. Pat. No. 6,217,800, both to Hayward further describe processes related to those of U.S. Pat. No. 5,882,570.

The Hayward processes are very limited in the scope of the source materials they use, and the type of end products they can produce. Hayward uses only unimpregnated graphite source materials, and his finished products are only formed by mixing the graphite powder with large proportions of resin and injection molding the mixture to form articles which are then thermoset.

Accordingly, there is a continuing need in the art for improved processes for producing flexible graphite sheets or products from various types of graphite materials, including those which are already resin impregnated, and for manufacture of more broadly useful products from those materials. Such improved processes are provided by the present invention.

SUMMARY OF THE INVENTION

As stated above, the present invention provides a method of manufacturing flexible sheets or mats of expanded graphite material. The mats manufactured by the process of the present invention are particularly useful in the manufacture of components in a PEM fuel cell, including electrodes and flow field plates.

In the production and use of flexible graphite sheets, scrap material may be generated. For example, in the production of flow field plates, a flexible graphite sheet may be shaped, impregnated with a resin, and after impregnation, cured. During this process, scrap flexible graphite sheet material may be produced before impregnation, after impregnation and before curing, and after impregnation and after curing. The scrap flexible graphite sheet material used before impregnation is described herein as regrind material or virgin regrind material. Sheet material produced after impregnation and before curing is described herein as uncured impregnated scrap (production scrap). The material produced after impregnation and after curing is described herein as cured regrind (regrind scrap). Furthermore, the present invention may use, as a source material, sheet material produced from recycled used material such as recycled fuel cell flow field plates.

Using the methods of the present invention, one can regrind the above sheet material and recycle the same into flexible graphite mats that may be further processed for use, e.g., as a material which can be formed into a component in a fuel cell.

The method of the present invention is advantageous because it provides a beneficial re-use of flexible graphic sheet material such as the uncured impregnated scrap and cured impregnated scrap used in the production of, for example, flow field plates. The present invention provides an advantageous use for such material and decreases disposal costs.

Specifically, one embodiment of the present invention is a method of manufacturing flexible sheets of expanded graphite material from recycled materials, comprising providing source materials in the form of flexible sheets of expanded graphite; comminuting the source materials into particles; re-expanding the particles; and preparing a mat from the re-expanded particles.

Another embodiment of the present invention is a process of manufacturing a graphite material comprising grinding a cured resin impregnated graphite material into particles; removing at least part of the resin from the particles; and expanding the resin removed particles.

It is an object of the present invention to provide a method for preparing graphite mats that can be manufactured from recycled materials.

Yet another object of the present invention is to provide material suitable for the construction of a component of a fuel cell manufactured using expanded graphite material from recycled materials.

Still another object of the present invention is to provide a method for manufacturing flexible sheets of graphite material from, as a source material, unimpregnated graphite sheet material, uncured resin impregnated graphite sheet material, and cured resin impregnated graphite sheet material.

Another object of the present invention is to provide a method of manufacturing flexible sheets of expanded graphite material from, as a source material, used, recycled, graphite material such as flow field plates and electrodes.

Another object of the present invention is to provide a process for manufacturing graphite material comprising: recycling resin impregnated graphite material and removing the resin from the recycled graphite material. The process of this embodiment includes removing at least part of the resin from the source material and re-expanding the resin removed particles.

Other and further objects, features, and advantages would be readily apparent to those skilled in the art, upon a reading of the following disclosure when taken in conjunction with the accompanying drawings.

DETAILED DESCRIPTION OF THE INVENTION

Figure 1:
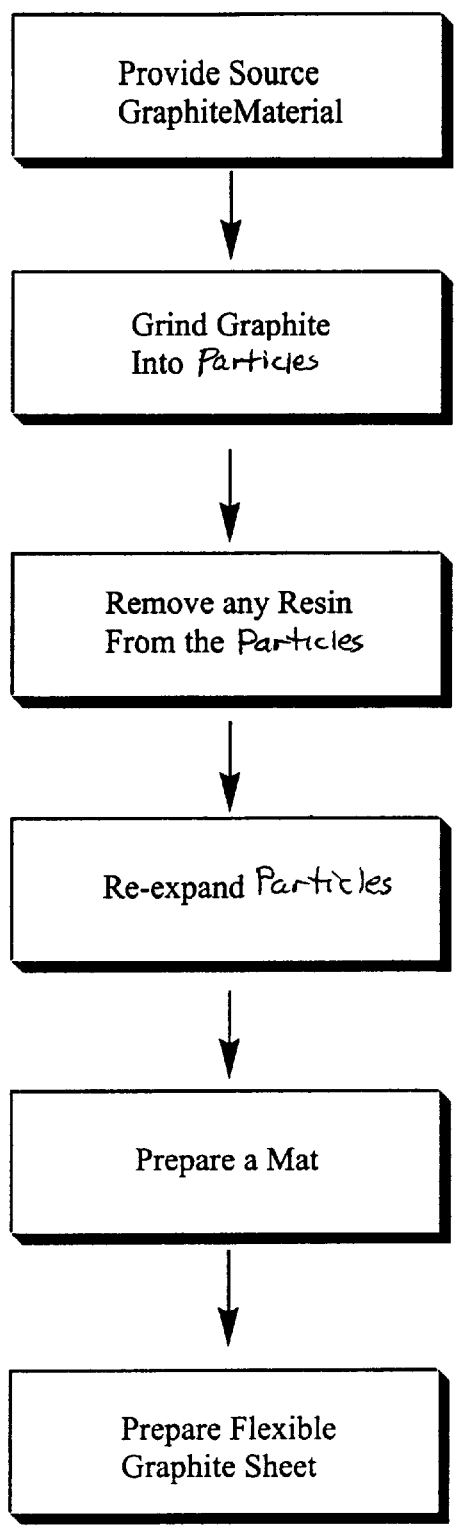
FIG. 1 is a flow chart showing an embodiment of the present invention wherein a flexible graphite sheet is manufactured.

The methods of the present invention comprise providing source materials such as flexible sheets of graphite material. The source materials typically comprise graphite, a crystalline form of carbon comprising atoms covalently bonded in flat layered planes with weaker bonds between the planes. In obtaining source materials such as the above flexible sheets of graphite, particles of graphite, such as natural graphite flake, are typically treated with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials for the flexible sheets suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials for the flexible sheets used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than twenty weight percent. More preferably, the graphite employed for the present invention will have a purity of at least about 94%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed.

Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one-half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether or bisphenol A (DGEBA) and other multifunctional resin systems; phenolic resins that can be employed include resole and novolac phenolics.

Nonetheless, the graphite sheet as prepared above is cut and trimmed to form the desired articles. The methods of the present invention may use the above-described graphite sheets including the trimmed portions. More specifically, the process of the present invention may use the above-described graphite sheets including the trimmed portions at various stages of completeness, as discussed below.

Figure 2:
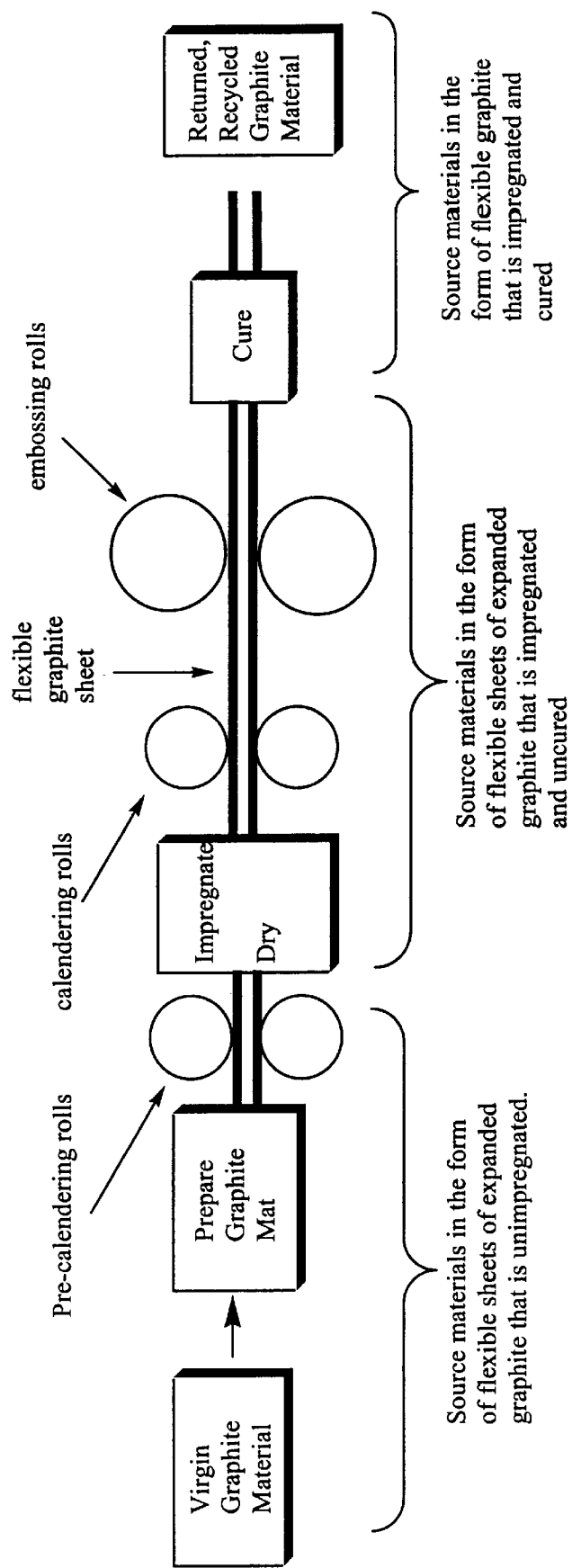
FIG. 2 is a schematic drawing of a process for producing flexible graphite sheets which may be used as source materials in the present invention.

An embodiment of the present invention includes a method of manufacturing flexible sheets of expanded graphite material from recycled materials, comprising providing source materials in the form of flexible sheets of expanded graphite such as the sheets discussed above. The source material may be sheets or trimmed portions of sheets that have been compressed with, for example, pre-calendering rolls, but have not yet been impregnated with resin. Furthermore, the source material may be sheets or trimmed portions of sheets that have been impregnated with resin, but not yet cured, or sheets or trimmed portions of sheets that have been impregnated with resin and cured. The source material may also be recycled flexible graphite PEM fuel cell components such as flow field plates or electrodes. These sources are generally shown in FIG. 2. Each of the various sources of graphite may be used as is or blended with natural graphite flakes.

Once the source material of flexible graphite sheets is available, it can then be comminuted by known processes or devices, such as a jet mill, air mill, blender, etc. to produce particles. Preferably, a majority of the particles have a diameter such that they will pass through 20 U.S. mesh; more preferably a major portion (greater than about 20%, most preferably greater than about 50%) will not pass through 80 U.S. mesh. Most preferably the particles have a particle size of no greater than about 20 mesh. It may be desirable to cool the flexible graphite sheet when it is resin-impregnated as it is being comminuted to avoid heat damage to the resin system during the comminution process.

The size of the comminuted particles may be chosen so as to balance machinability and formability of the graphite article with the thermal characteristics desired. Thus, smaller particles will result in a graphite article which is easier to machine and/or form, whereas larger particles will result in a graphite article having higher anisotropy, and, therefore, greater in-plane electrical and thermal conductivity.

If the source material has been resin impregnated, then preferably the resin is removed from the particles. Details of the resin removal are further described below.

Once the source material is comminuted, and any resin is removed, it is then re-expanded. The re-expansion may occur by using the intercalation and exfoliation process described above and those described in U.S. Pat. No. 3,404,061 to Shane et al. and U.S. Pat. No. 4,895,713 to Greinke et al.

Typically, after intercalation the particles are exfoliated by heating the intercalated particles in a furnace. During this exfoliation step, intercalated natural graphite flakes may be added to the recycled intercalated particles.

Preferably, during the re-expansion step the particles are expanded to have a specific volume in the range of at least about 100 cc/g and up to about 350 cc/g or greater.

Finally, after the re-expansion step, the re-expanded particles may be formed into a mat using, for example, the process for forming a graphite sheet discussed above. This process is generally shown in the flow chart of FIG. 1.

This newly formed flexible graphite sheet may be further formed into the components of a PEM fuel cell discussed above. As stated above, in this embodiment the source materials may include uncured resin impregnated expanded graphite sheets and cured resin impregnated expanded graphite sheets.

The methods of the present invention may further comprise calendering the mat into a flexible sheet of expanded graphite material. The specific calendering method is not known to be critical, and any method known in the art is suitable.

If the starting material has been impregnated with a resin, an important embodiment of the method of the present invention is removing at least part of the resin from the particles. This removal step should occur between the comminuting step and the re-expanding step.

In one embodiment, the removing step includes heating the resin containing regrind particles, such as over an open flame. More specifically, the impregnated resin may be heated to a temperature of at least about 250° C. to effect resin removal. During this heating step care should be taken to avoid flashing of the resin decomposition products; this can be done by careful heating in air or by heating in an inert atmosphere. Preferably, the heating should be in the range of from about 400° C. to about 800° C. for a time in the range of from at least about 10 and up to about 150 minutes or longer.

Additionally, the resin removal step may result in increased tensile strength of the resulting sheet produced from the calendering step as compared to a similar method in which the resin is not removed. Therefore, when the process of the present invention further comprises calendering the mat into a flexible sheet of expanded graphite material, the resin removing step results in increased tensile strength of the sheet created in the calendering step, as compared to a similar method in which the resin is not removed. More specifically, the sheet created in the calendering step can have a tensile strength of at least about 300 psi.

The resin removal step may also be advantageous because during the expansion step (i.e., intercalation and exfoliation), when the resin is mixed with the intercalation chemicals, it may in certain instances create toxic byproducts.

Thus, by removing the resin before the expansion step a superior product is obtained such as the increased strength characteristics discussed above. The increased strength characteristics are a result of in part because of increased expansion. With the resin present in the particles, expansion may be restricted.

In addition to strength characteristics and environmental concerns, resin may be removed prior to intercalation in view of concerns about the resin possibly creating a run away exothermic reaction with the acid.

In view of the above, preferably a majority of the resin is removed. More preferably, greater than about 75% of the resin is removed. Most preferably, greater than 99% of the resin is removed.

Figure 3:
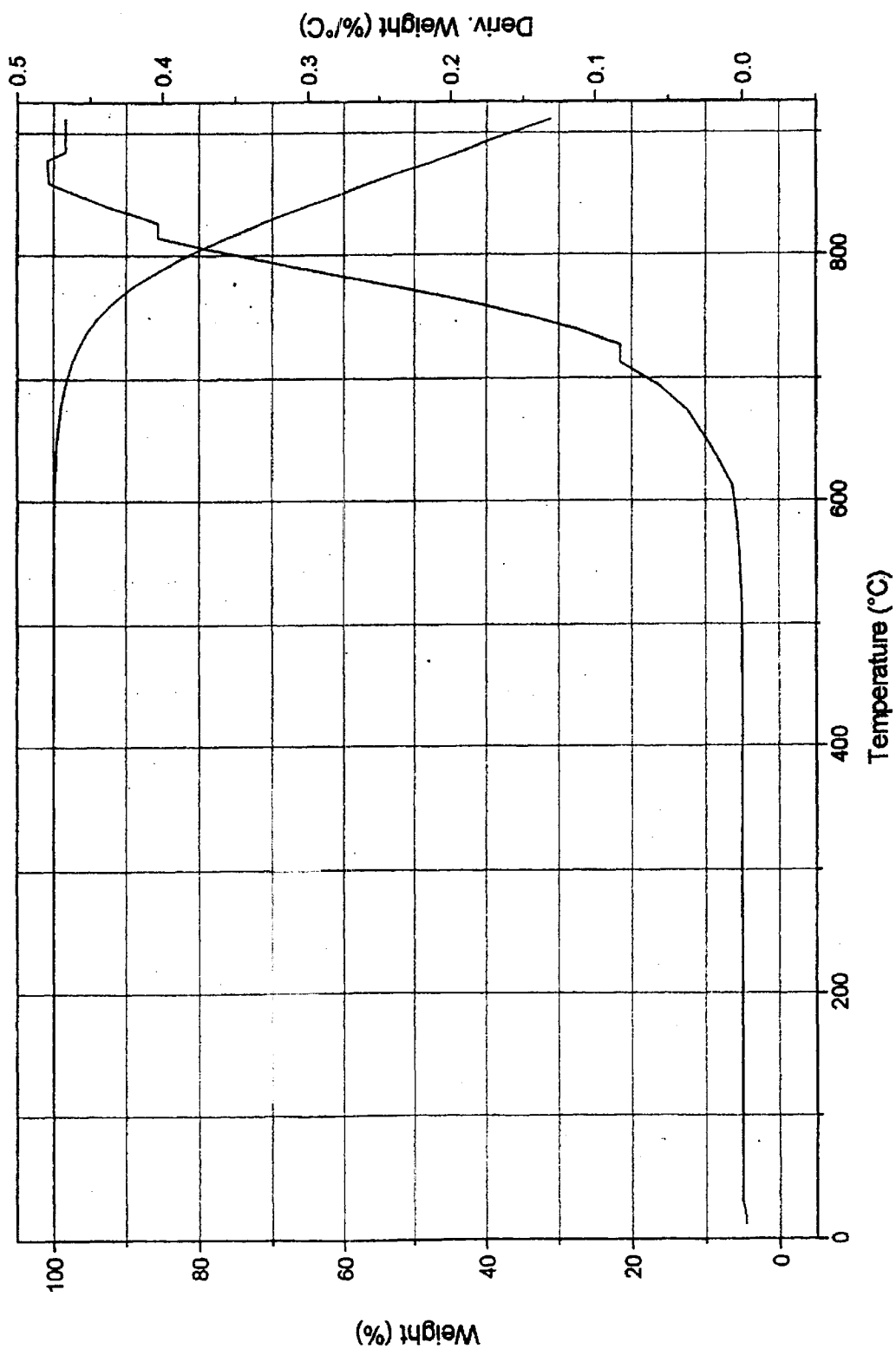
FIGS. 3–5 are charts showing a thermogravimetric analysis demonstrating the temperatures at which resin may be removed from the source material.
Figure 4:
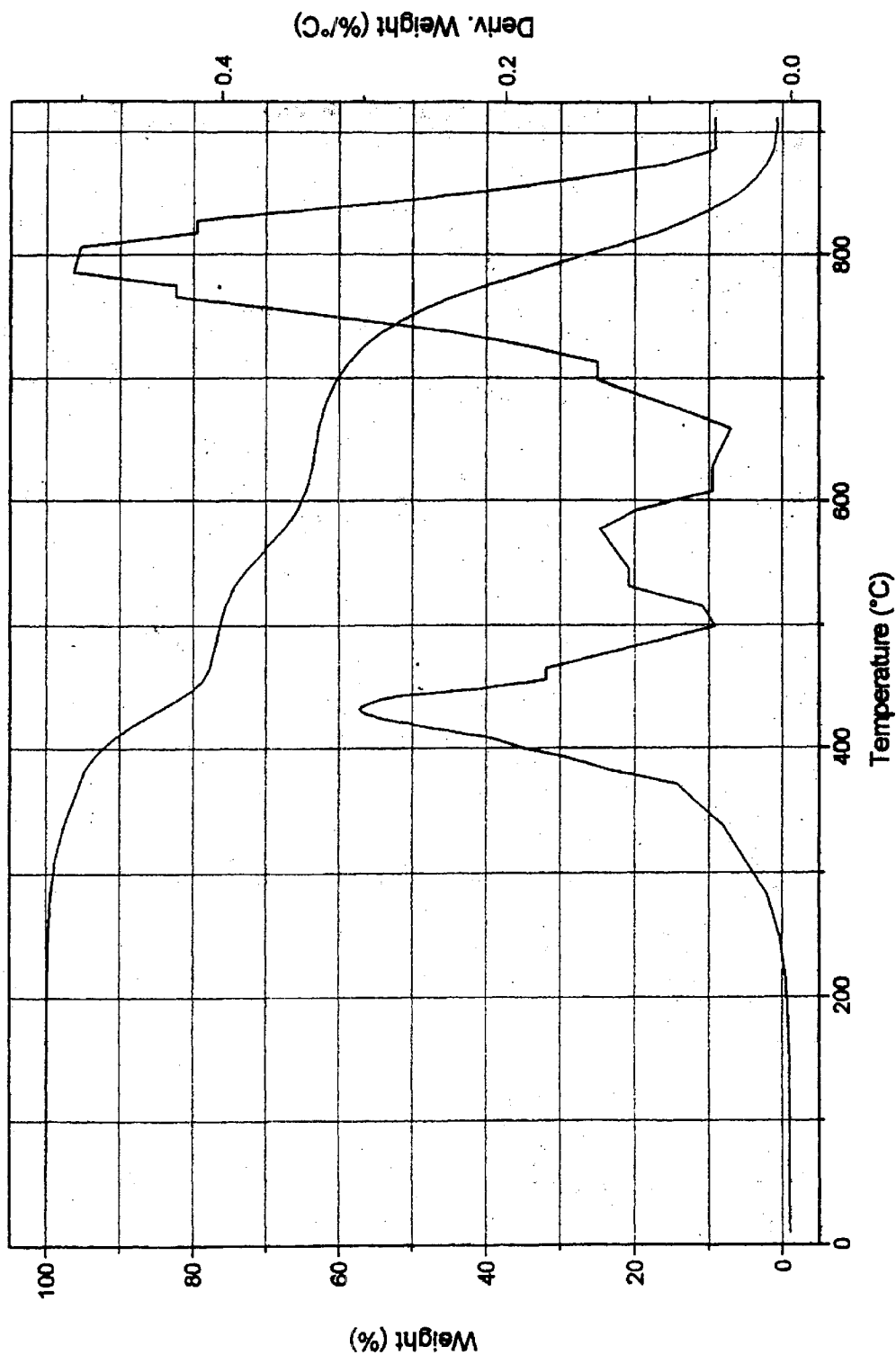
Figure 5:
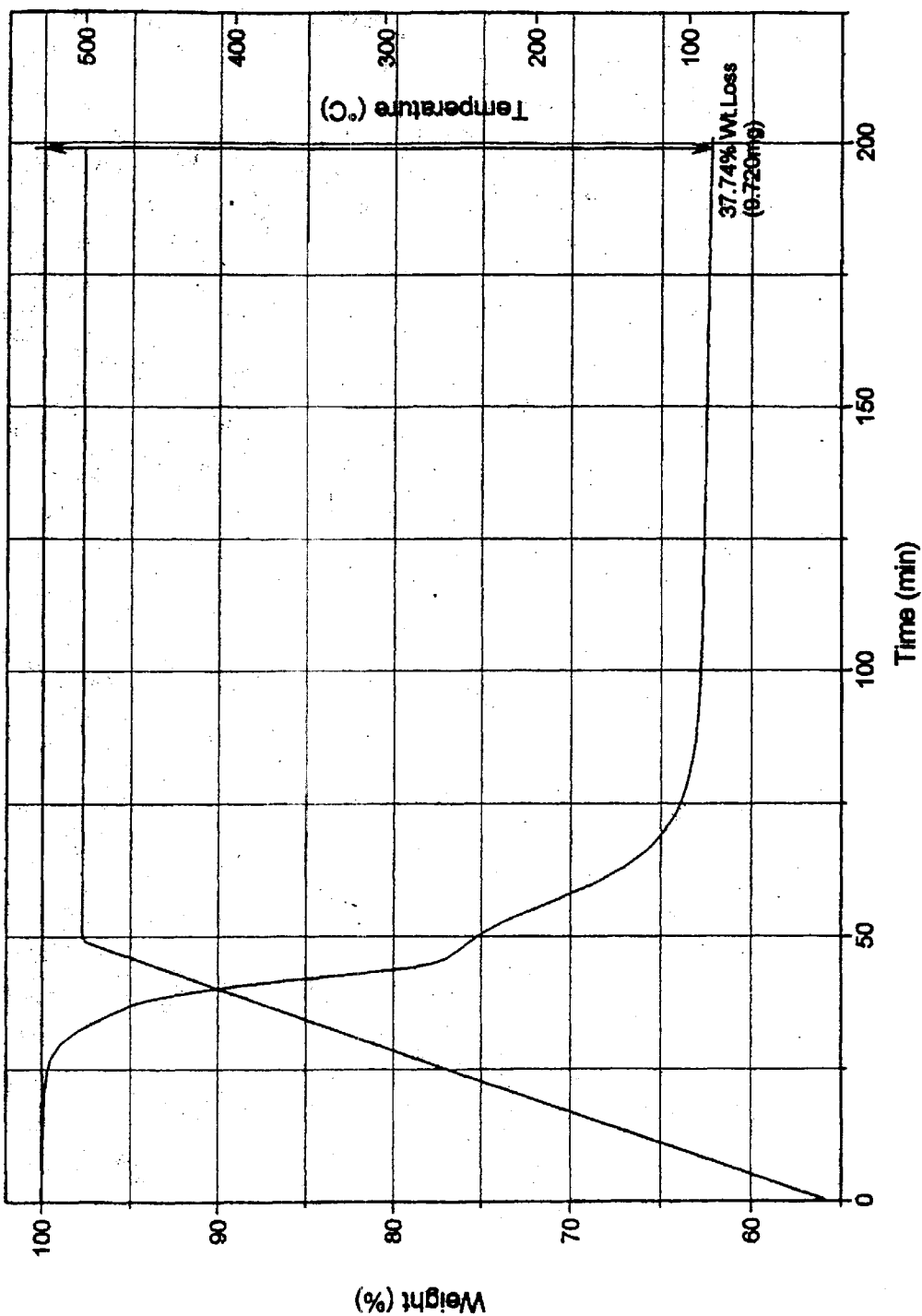

Exemplary resin removal temperatures are shown in FIGS. 3–5. FIGS. 3–5 are thermogravimetric analysis charts showing the temperatures at which epoxy resin may be removed from the graphite source material. FIG. 3 is an informational chart that demonstrates a 100% graphite sample (i.e., no resin added) of a flexible graphite sheet heated at 10° C./min in air, begins losing weight at approximately 600° C. Therefore, in recycling flow field plates, for example, the resin is preferably removed at less than 600° C. in order to leave the graphite intact so that it may be recycled.

FIG. 4 is the same type of analysis as FIG. 3, with the exception that the source material contains 37.5% epoxy and 62.5% graphite. Weight loss begins at approximately 250° C. and all the resin is removed at approximately 600° C. Therefore, in a preferred embodiment of the invention, the resin is removed at a temperature from 250° C. to about 600° C.

FIG. 5 demonstrates the weight loss for a similar material as the material of FIG. 4, however as shown in FIG. 5 the material is heated to 500° C. at 10° C./min and held for 150 minutes at 500° C. This treatment should be sufficient to burn off virtually all the resin and leave the graphite intact for recycling purposes.

All cited patents and publications referred to in this application are incorporated by reference.

The invention thus being described, it will be obvious that it may be varied in many ways. Such variations are not to be regarded as a departure from the spirit and scope of the present invention and all such modifications as would be obvious to one skilled in the art are intended to be included within the scope of the following claims.

We claim:

1. A method of manufacturing flexible sheets of expanded graphite material from recycled materials, comprising:
   (a) providing source materials in the form of flexible sheets of expanded graphite;
   (b) comminuting the source materials into particles;
   (c) removing at least part of the resin from the particles;
   (d) re-expanding the particles; and
   (e) preparing a mat from the re-expanded particles.

2. The method of claim 1, further comprising:
   compressing the mat into a flexible sheet of expanded graphite material.

3. The method of claim 1, wherein:
   in step (a) the source materials are selected from the group consisting of unimpregnated expanded graphite sheets, uncured resin impregnated expanded graphite sheets and cured resin impregnated graphite sheets.

4. The method of claim 1, wherein:
   in step (a) the source materials include resin impregnated expanded graphite sheets.

5. The method of claim 1, wherein:
   the removing step includes heating the particles, while avoiding flashing of the resin decomposition products from the particles.

6. The method of claim 1, wherein:
   the removing step includes heating the particles at less than about 600° C.

7. The method of claim 1, wherein:
   the removing step includes heating the particles to a temperature in a range of from about 250° C. to about 600° C.

8. The method of claim 1, wherein:
   the removing step includes heating the particles at about 500° C. for about 150 minutes.

9. The method of claim 1, further comprising:
   compressing the mat into a flexible sheet of expanded graphite material; and
   wherein the removing step results in increased tensile strength of the sheet created in the compressing step, as compared to a similar method in which the resin is not removed.

10. The method of claim 1, wherein the removing step further comprises:
    removing greater than 75% of the resin.

11. The method of claim 1, wherein:
    step (c) includes steps of intercalating the particles and heating the intercalated particles.

12. The method of claim 11, wherein:
    in step (c), the particles are expanded to have a specific volume of at least about 100 cc/g.

13. The method of claim 1, wherein:
    in step (b), the particles have a particle size of no greater than about 20 mesh.

14. The method of claim 1, further comprising:
    impregnating the mat with resin;
    calendering the impregnated mat into a flexible sheet of expanded graphite material; and
    embossing and curing the sheet.

15. The method of claim 1, further comprising:
    blending the particles with expandable natural graphite flakes.

16. The method of claim 15, wherein:
    step (c) includes steps of intercalating the particles and exfoliating the intercalated particles by heating the intercalated particles in a furnace; and
    the blending step occurs in the furnace during the exfoliation process.

17. A process of manufacturing a graphite material comprising:
    (a) grinding a resin impregnated graphite material into particles;
    (b) removing at least part of the resin from the particles; and
    (c) expanding the resin removed particles.

18. The process of claim 17, further comprising:
    after step (c), forming the expanded resin removed particles, into a flexible sheet of graphite material.

19. The process of claim 17, wherein:
    step (c) includes an intercalation process followed by exfoliation of the intercalated particles in a furnace.

20. The process of claim 19, further comprising:
    blending expandable natural graphite flake material with the intercalated particles in the furnace during the exfoliation process.

21. The method of claim 17, wherein step (b), further comprises:
    heating the particles, while avoiding flashing of therein decomposition products from the particles.

22. The method of claim 17, wherein:
    the removing step includes heating the particles at less than about 600° C.

23. The method of claim 17, wherein:
    the removing step includes heating the particles to a temperature in a range of from about 300° C. to about 600° C.

24. The method of claim 17, wherein;
    the remeving step includes heating the particles in the range of from about 400° C. to about 800° C. for a time in the range of from about 10 to about 150 minutes.

25. The method of claim 17, wherein:
    in step (a), the particles have a particle size of no greater than about 20 mesh.

26. The method of claim 17, wherein:
    in step (b), greater than 75% of the resin is removed.

* * * * *